No. 623,029. Patented Apr. 11, 1899.
J. H. K. McCOLLUM.
AIR VALVE.
(Application filed June 23, 1898.)

(No Model.)

Witnesses.
H. J. S. Young.
H. Dennison.

Inventor:
J. H. K. McCollum.
by
Fetherstonhaugh & Co
Attys.

UNITED STATES PATENT OFFICE.

JAMES HARRY KEIGHLY McCOLLUM, OF TORONTO, CANADA.

AIR-VALVE.

SPECIFICATION forming part of Letters Patent No. 623,029, dated April 11, 1899.

Application filed June 23, 1898. Serial No. 684,254. (No model.)

*To all whom it may concern:*

Be it known that I, JAMES HARRY KEIGHLY MCCOLLUM, electrician, of the city of Toronto, in the county of York, in the Province of Ontario, Canada, have invented certain new and useful Improvements in Air-Valves, of which the following is a specification.

My invention relates to improvements in air-valves more particularly adaptable for pneumatic tires; and the object of the invention is to design a form of air-valve which will be easy to pump and be readily rendered air-tight after being pumped with but slight exertion and so much so that a child even can manipulate it; and it consists, essentially, of providing the hollow stem of the valve with a shoulder and a screw-plug having a central orifice and notch at the top designed to be screwed down into the hollow stem, so that the tapered bottom of the plug may fit against the shoulder, the bottom of the plug having attached thereto a flexible rubber tubular stem having a flattened inner end, a cap being also provided; with a central pin and a rubber washer fitting above such pin, which cap is designed to be screwed down into position, so that when the head of the pin abuts the top of the screw-plug such washer will be compressed upon further screwing down, so as to render the pump absolutely air-tight under all conditions, as hereinafter more particularly explained.

Figure 1:
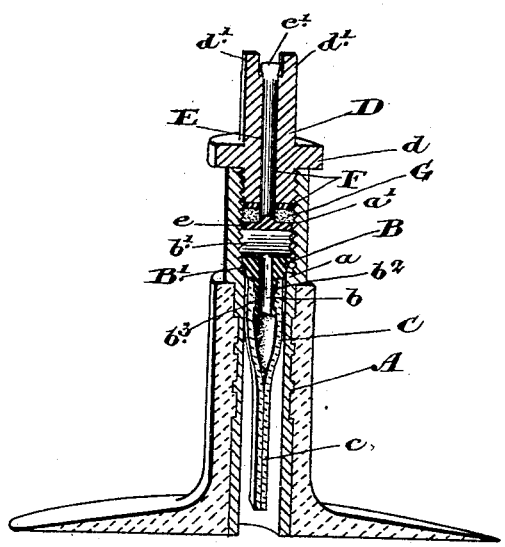
Figure 2:
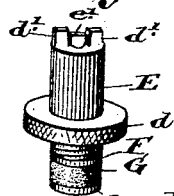
Figure 3:
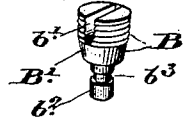

Figure 1 is a sectional perspective view of my air-valve. Fig. 2 is a perspective detail of the cap. Fig. 3 is a detail of the screw-plug.

In the drawings like letters of reference indicate corresponding parts in each figure.

A is the hollow valve-stem, which is provided with an internal shoulder $a$ and internal thread $a'$, extending above the shoulder.

B is a screw-plug which is provided with a central orifice $b$ and a cross-notch $b'$ and a tapered central portion B', designed to form a seat upon the sharp shoulder $a$, and a reduced lower end $b^2$, having an annular recess $b^3$, upon which is fitted the flexible rubber tubular stem C, having a flattened lower end portion which is molded, so as to normally hold together, but is yet capable of expansion in order to permit of the ingress of the air through it, although preventing egress.

D is a cap which is provided with a central flange $d$, the top projections $d'$, diametrically opposite each other, and the central orifice $d^2$. Through the central orifice extends a pin E, which has a flat head $e$, between which and a washer F at the bottom of the cap is situated a soft-rubber washer G. The top of the pin E is flattened at $e'$, so as to hold it in position and yet allow of the head and washers F and G to turn as the cap is being screwed into position.

The utility of my invention will now be understood. By removing the cap the pump may be inserted into position in the usual manner and the air pumped through the orifice $b$ and tubular stem C, the flat portion of which expands in order to permit of the air to pass through into the interior of the tire. By restoring the cap to the position shown in the drawings, which is the normal position, and bringing the head $e$ of the pin E down against the top of the screw-plug B and then still further screwing down the washer G is expanded laterally, as indicated in the drawings, so as to fit into the thread and entirely prevent any danger of the egress of the air.

When the cap is removed, the tire may be deflated by turning the cap upside down and inserting the projections $d'$ of the cap into the notch $b'$, so that the plug is unscrewed or raised off its seat on the sharp shoulder $a$, when the air will pass out around the tubular stem and the tapered portion of the plug and through the notch B'.

What I claim as my invention is—

1. In an air-valve for pneumatic tires or the like, the combination with the hollow valve-stem internally threaded and provided with a shoulder intermediate of its length, of a screw-plug provided with a tapered intermediate portion designed to fit against the internal shoulder and a lower reduced portion having fitted thereon the flexible tubular stem provided with a flattened expansible lower end and an upper notch all arranged as and for the purpose specified.

2. In an air-valve for pneumatic tires or the like, the combination with the hollow valve-stem internally threaded and provided with a shoulder intermediate of its length, of a screw-plug provided with a tapered intermediate portion designed to fit against the internal shoulder and a lower reduced portion having fitted thereon the flexible tubular stem provided with a flattened expansible lower end, and an upper notch, and the cap provided with a central hole and pin extending through the hole provided with a flattened lower head and a soft washer fitting between such head and the bottom of the cap as and for the purpose specified.

3. In an air-valve for pneumatic tires and the like, the combination with the hollow valve-stem internally threaded, of the cap provided with a screw-thread, a central hole, a pin provided with a flat head and a soft washer fitting between such head and the bottom of the cap and means within the stem for compressing the soft washer so as to expand it laterally when the cap is screwed down as and for the purpose specified.

4. In an air-valve for pneumatic tires and the like, the combination with the hollow valve-stem internally threaded, of the cap provided with a screw-thread, a central hole, a pin provided with a flat head, a metal washer situated next the bottom of the cap and a soft washer fitting between the metal washer and the flat head and means within the stem for compressing the soft washer, so as to expand it laterally when the cap is screwed down as and for the purpose specified.

JAMES HARRY KEIGHLY McCOLLUM.

Witnesses:
  B. BOYD,
  A. McADAM.